June 19, 1934.   E. C. FICHTNER   1,963,655
THERMOSTATIC CONTROL
Filed July 21, 1930   4 Sheets-Sheet 1
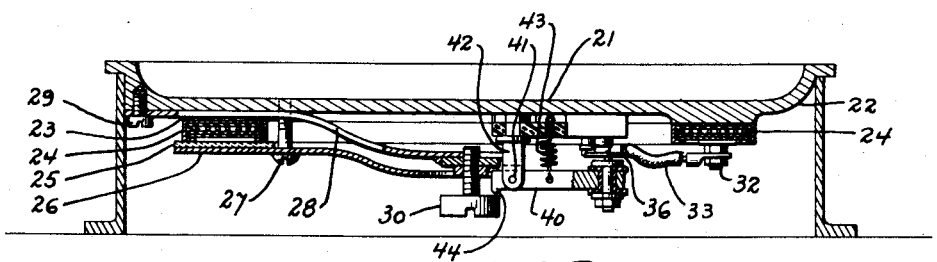
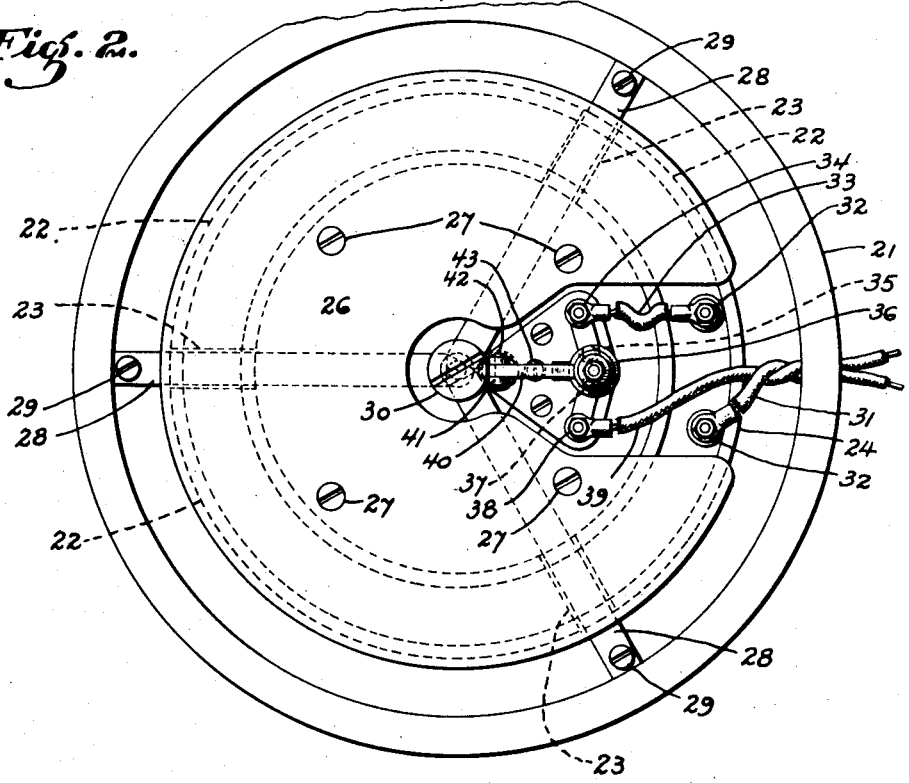
INVENTOR.
Edwin C. Fichtner.
BY
Townsend, Loftus & Ablett
ATTORNEYS.

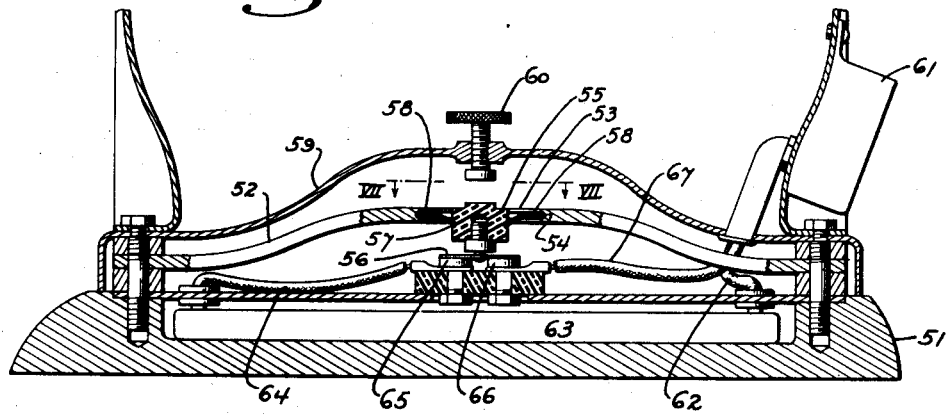
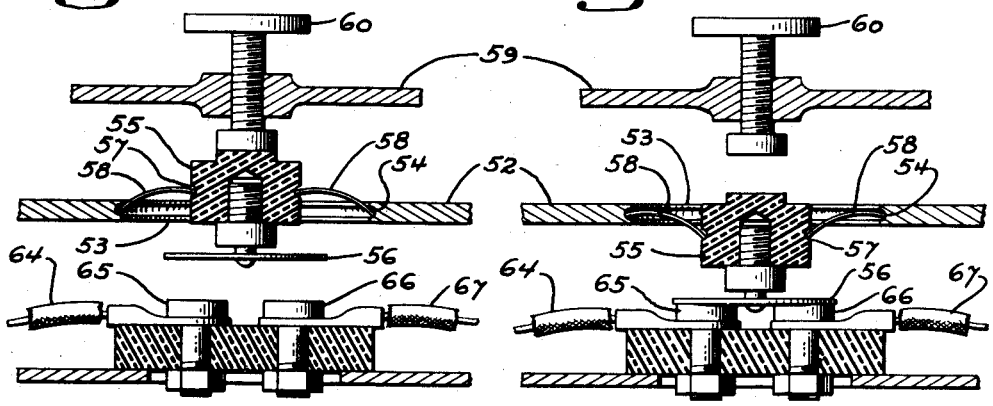
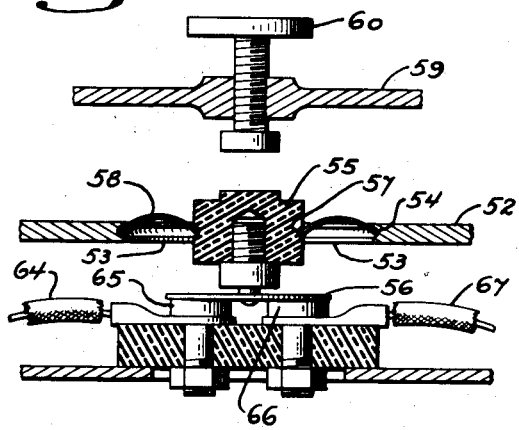
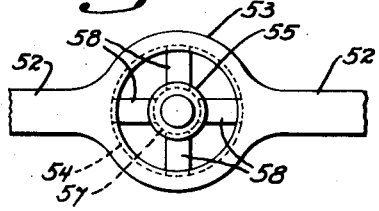

June 19, 1934.  E. C. FICHTNER  1,963,655
THERMOSTATIC CONTROL
Filed July 21, 1930  4 Sheets-Sheet 3
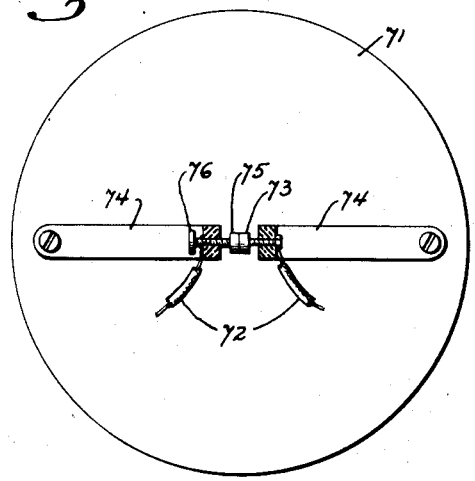
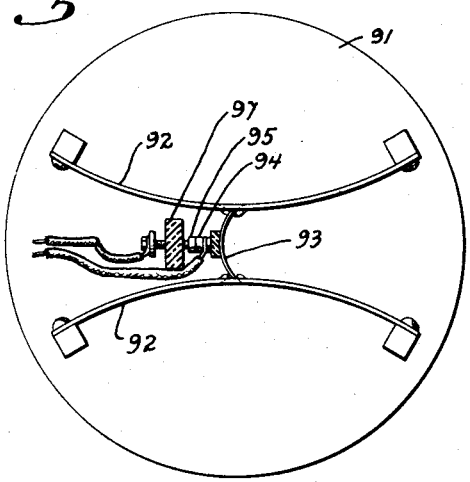
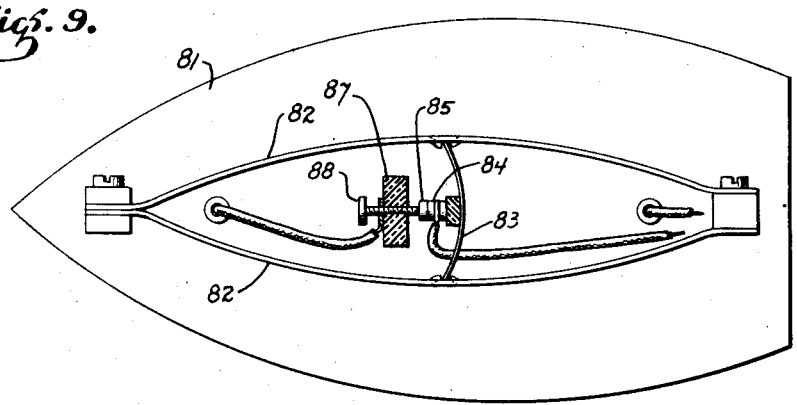
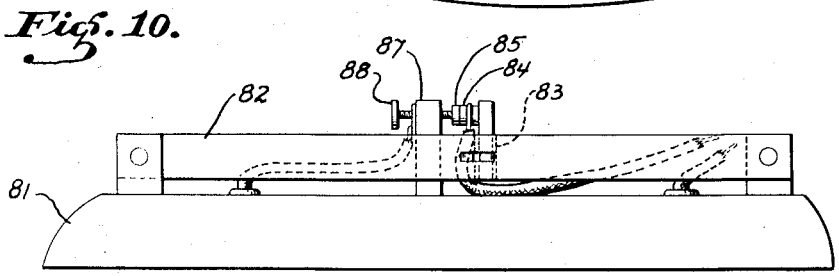
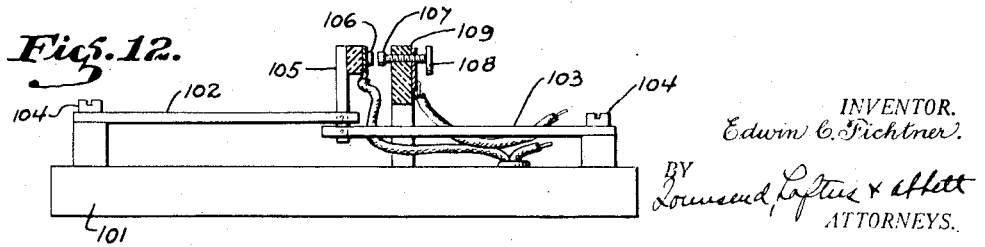
INVENTOR.
Edwin C. Fichtner.
BY
Townsend Loftus & Abbott
ATTORNEYS.

June 19, 1934.   E. C. FICHTNER   1,963,655
THERMOSTATIC CONTROL
Filed July 21, 1930   4 Sheets-Sheet 4
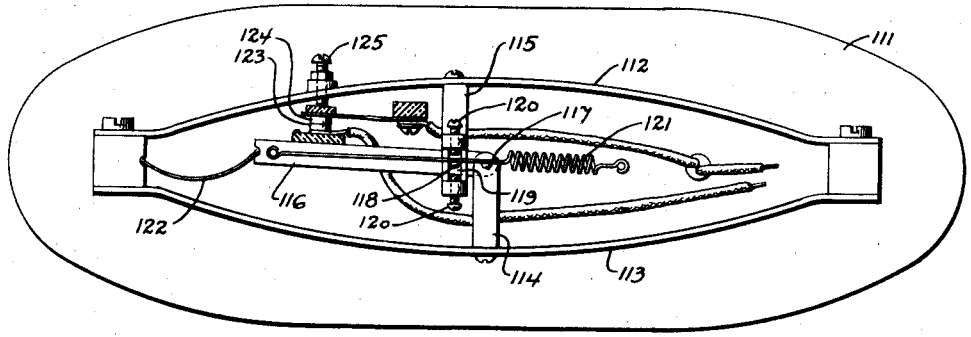
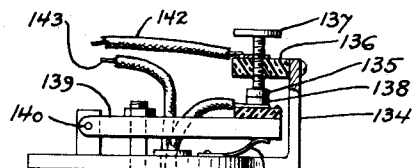
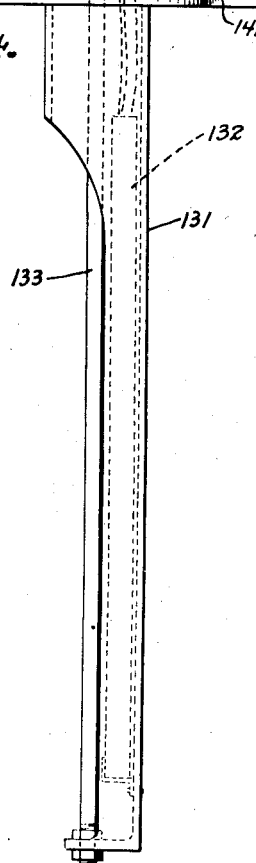
INVENTOR.
Edwin C. Fichtner.
BY
Townsend, Loftus & Abbett
ATTORNEYS.

Patented June 19, 1934

1,963,655

UNITED STATES PATENT OFFICE 1,963,655

THERMOSTATIC CONTROL

Edwin C. Fichtner, San Francisco, Calif.

Application July 21, 1930, Serial No. 469,319

4 Claims. (Cl. 219—37)

My invention relates to the control of the temperature of heated and/or heating devices, no matter for what purpose they may be used, and it is especially adapted to use in connection with devices in which the heat is electrically generated, although it may be used in conjunction with devices wherein the heat is otherwise generated.

An object of my invention is to provide a controlling means which will automatically cut the source of heat in or out, as may be required to maintain constant the temperature of the heated element.

Another object of the invention is to provide a thermally responsive element which is simpler in construction than those heretofore used.

Another object of the invention is to provide a thermally responsive element which is of more rugged construction than those heretofore used.

Another object of the invention is to provide a control which avoids any fluttering and which functions with greater exactness than prior devices.

Another object of my invention is to omit one of the members of the bimetallic elements previously used in electrical heating devices and to make the remaining parts co-operate in such manner as to produce the effects previously produced with such bimetallic elements.

Other objects of the invention will be apparent from the following description, taken in connection with the accompanying drawings, which form a part hereof.

Many electrically heated devices have been constructed or proposed which comprise a thermally responsive element consisting of a bimetallic strip, each of the metals in the strip having a different heat coefficient of expansion so that motion of such strip is caused by change in temperature, whereby the electric current may be cut in or out. My invention, with regard to the broadest aspects thereof, includes making the element to be heated one of the members of such a thermally responsive bimetallic element, thus eliminating a part hitherto used and at the same time making the device as a whole stronger in construction and having greater capability of finer control and also eliminating the fluttering occurring in the prior devices.

As illustrative of my invention, I will show and describe various embodiments thereof, it being understood that the scope of my invention is not limited merely to the embodiments so referred to.

Referring to the appended drawings—

Fig. 1 is a sectional view of an electrically heated device having my invention applied thereto, Fig. 2 is a bottom plan view thereof, Fig. 3 is a sectional view of an electrical heating device having a modified form of my invention applied thereto, Figs. 4, 5 and 6 are detail views showing the various positions of the parts of the device of Fig. 3, Fig. 7 is a top plan view of an element as seen from the line VII—VII on Fig. 3, Fig. 8 is a more or less diagrammatic plan view of another embodiment of my invention, Fig. 9 is a similar view of another embodiment, Fig. 10 is an elevation of the modification of Fig. 9, Fig. 11 is a more or less diagrammatic plan view of another embodiment of my invention, Fig. 12 is an elevation of still another embodiment thereof, Fig. 13 is a more or less diagrammatic view of still another modification, and Fig. 14 is an elevation of still yet another modification.

One of the important features of my invention is the use of the heated and/or heating member as one of the elements of a bimetallic thermally responsive means and I combine with such heated and/or heating member one or more members having a different heat coefficient of expansion than said heated member in such manner as to cause a movement which may be used to control the heating effect and to maintain the temperature constant.

Referring to Figs. 1 and 2, 21 is a member to be heated and which, in turn, is to impart heat at a constant temperature for any purpose whatsoever. Integral with the member 21 are arc-shaped shoulders 22 which may be three in number, forming grooves 23 between the ends thereof, and mounted on said shoulders is a ring-shaped electrical heating unit 24. An asbestos pad 25 of annular shape lies on such heating unit and the device is maintained assembled by means of the plate 26 held in position by screws 27 fitted into threaded openings in the heated element 21. A three-legged spider-like member 28 of metal having a different heat coefficient of expansion than that of the heated member 21 and preferably, though not necessarily, having a lower heat coefficient of expansion, and which preferably is practically zero, is attached at the outer ends of the legs thereof to the heated member 21 by means of screws 29. The legs of the spider are bent slightly upwardly as they approach the point of connection with each other and at such central point I provide an adjusting member consisting of a tightly fitting screw 30.

The current for heating the electrical element flows from the lead 31 through the binding post 32 on such element, then into and through said element out through the binding post 32, through the lead 33, binding post 34 and switch contact 35, from which it passes by a bridging member 36 to the other switch contact member 37, binding post 38, and out through the lead 39 connected thereto. The bridging member 36 is insulatedly mounted on the arm 40 pivoted at 41 on the supporting post 42, the arm being normally held down to contact the bridging member with the two switch contacts by the tension spring 43.

If the spider-like member has a lower heat coefficient of expansion than the heated member 21, as the temperature increases the member 21 will, of course, expand to a greater degree than such spider-like member and such member will consequently be made more flat and the central portion thereof will approach nearer to the heated member 21. The adjusting screw 30 fits tightly in the central portion of the spider-like member in order that the adjustment may not be accidentally disturbed, but it should not fit so tightly that it may not be adjusted manually by means of a screw-driver. With the proper adjustment, as the central portion of the spider-like member approaches the heated member 21, the head of such screw will contact with the short arm 44 of the lever 40 and raise the bridging member from out of contact with the switch contacts 35 and 37, thereby breaking the current. The member 21 may be made of any suitable material, such as iron or aluminum, or any other suitable metal, and it is possible to obtain in commerce metals or alloys of such a low coefficient of expansion, in fact, practically zero, that a very fine and exact regulation of the temperature of the member 21 is attained. After the current has been shut off, as described, a very slight cooling of the member 21 will cause such relative motion of the parts that the spring 43 may move the lever arm to again close the circuit.

While I have illustrated a spider-like member having three legs, it is to be understood that it may have any desired number of legs and that such a member may be replaced by a single strip which may be said to be a two-legged spider-like member.

Referring to Figs. 3 to 7, inclusive, the heated element is designated 51 and fixedly connected therewith is a strip of material 52 bowed upwardly somewhat at the center thereof, which is expanded to form an annulus 53 having a groove 54 on the inner face thereof. Centrally of the annulus is a member 55 of insulating material and carrying the bridging member 56. The member 55 is provided with a groove 57 about the periphery thereof, and four bowed spring members 58 fit into the two grooves to support the member 55 movably in either up or down position. A member 59 suitably supports the adjusting screw 60.

The electrical current enters this device by means of one terminal of the plug socket 61, then passes by means of the insulated conductor 62 to the heated element 63, from which it passes by means of the insulated conductor 64 to a switch terminal 65, from which it passes by means of the bridging member 56 to the other switch terminal 66, and then by means of the insulated conductor 67 to the other terminal of the plug socket. The heat coefficient of expansion of the member 52 is less than that of the heated element 51, whereby the annulus 53 will approach nearer to the member 51 as the temperature rises and recedes therefrom, as the temperature falls, as in the device of Figs. 1 and 2. The spring mounting of the member carrying the bridging member is such that the bridging member will contact with and recede from the switch contacts by a snap action. This takes place in the following manner. When the switch is closed by the bridging member 56 and when the member 51 becomes too hot, the annulus will move nearer to the member 51, but it will be impossible for the bridging member to move so that the annulus will move downwardly with respect to the member 55. The beginning of this movement is illustrated in Fig. 4 and then just after the parts move through the position shown in Fig. 5, that is, when the part of the spring in the groove 54 becomes a little lower than the part of the spring in the groove 57, the spring causes the member 55 to snap upwardly as shown in Fig. 6 and to open the circuit with a quick snap action. Then, as the member 51 cools down, the annulus 53 is caused to rise by contraction of the member 51, whereupon the member 55 is stopped by the adjusting screw 60 and further upward movement of the annulus, after the parts of the springs 58 in the groove 54 are above the parts in the groove 57, causes a downward snap of the member carrying the bridging member of the switch. It is, of course, understood that the showing in Figs. 4, 5 and 6 is exaggerated.

Referring to Fig. 8, 71 designates a plate to be heated, the current for accomplishing such heating passing by means of the leads 72 through a switch, one contact member 73 of which is mounted on a straight strip of metal 74 having a lower coefficient of expansion than the material of which the heating member 71 is made, while the other switch contact 75 is adjustably mounted, as by means of an adjusting screw 76 on a similar straight strip of metal. The contacts 73 and 75 will separate from each other as the plate 71 expands and with proper adjustment they will again come into contact as the plate contracts, whereby the plate 71 may be held at a fixed temperature.

Referring to Figs. 9 and 10, the heated element is designated 81 and fixed thereon are two bowed strips 82 of material having a lower heat coefficient of expansion than the material of which the heated element 81 is made. A bowed spring 83 is fixed in position with one end thereof attached to one member 82 while the other end thereof is attached to the other end 82, whereby expansion and contraction of the member 81 will cause the switch contact 84 insulatedly mounted on the bowed member 83, respectively to recede from and to contact with the adjustable contact member 85 of the switch mounted on the insulating block 87, adjustment of the contact 85 being secured by the screw 88.

Referring to Fig. 11, it will be seen that the device is very similar to that illustrated in Figs. 9 and 10, except that the longitudinal bowed members are bowed inwardly instead of outwardly. Such members designated 92 are mounted on the heated member 91 and they carry between them the bowed member 93, which moves the switch contact 94 mounted thereon toward and away from the switch contact 95 adjustably mounted on the insulating block 97.

In Fig. 12, the heated element is designated 101, upon which two bars 102 and 103 of material having a lower coefficient of expansion than the member 101 are fixed at their ends by means of screws 104. Each of the bars 102 and 103 is pivoted to a lever 105 which carries a switch contact 106, while the other switch contact 107 is adjustably mounted by means of screws 108 in the insulating block 109. Expansion and contraction of the member 101 will close and open the switch, as previously described.

Referring to Fig. 13, 111 designates the heated element to which two bowed members 112 and 113, similar to the members 82 of Fig. 9, are attached at their ends. An arm 114 is attached to the member 113 and another arm 115 is attached to the member 112, while an arm 116 has a pivotal connection 117 at its end with the end of the arm 114. The arm 116 carries a pin 118 which rides in a slot 119 formed in the arm 115, the effective length of this slot being adjustable, as by means of the screws 120. The arm 116 is thus capable of a slight pivotal movement about the point 117. Fixed to a point beyond and in line with the axis of the arm 116 when in its middle position, is a tension spring 121 which is connected to the arm 116 adjacent its outer end and, in addition thereto, a bowed spring 122 similar to the springs 58 of the modification of Fig. 3, is located with one end in a groove in the end of the arm 116 and the other end in a groove of a member stationary on the device. The arm 116 carries an insulatedly mounted switch contact member 123, which cooperates with the fixed switch contact member 124 and which is adjustable by means of the adjusting screw 125. As the member 111 expands beyond the point corresponding to the temperature desired, the arms 112 and 113 will tend to straighten out and to approach each other, which will cause the switch contact 123 to move away from the switch contact 124, the parts being so adjusted that the springs 121 and 122 will effect a very quick snap action. The switch members will likewise close with a snap action when the temperature is below that desired. The two springs 121 and 122 are very effective when used together, but good results may also be obtained with either one alone.

In Fig. 14 I illustrate a modification of the invention applicable for immersion into liquids to heat the same at a predetermined fixed temperature. This comprises a casing 131 which is the member to be heated and which is to impart its heat to the liquid, this casing containing a heating element 132. Attached to the lower end of the casing is a member 133 consisting of material having a different coefficient of expansion than that of the casing, and preferably less. A switch member is mounted on a support 134 above the casing, one contact 135 of which is stationary, but adjustably supported in the insulating member 136 on the lower end of the set screw 137, while the movable switch contact 138 is supported on the end of a lever 139 pivotally mounted at 140 on the supporting frame, the lever 139 being normally urged upwardly by a spring 141. Current enters through the lead 142 to the switch contact 135 and passes to the switch contact 138, through the heating element, and out through the lead 143. The member 133 is connected with the lever 139 in such manner that it can pull said lever down to open the switch, but it need not necessarily push it upwardly to close it. Slight overheating of the casing 131 will thus cause the switch to open, and cooling thereof to the desired temperature will permit the switch 141 to again close the switch.

While in the description of the devices shown in the drawings I have specified materials having different coefficients of expansion, it has been proven that in some instances this is not necessary. Owing to the fact that the heating element is closer to and imparts more heat to the heated element than to the members through which the motion of expansion is transferred to the switch, it is apparent that materials having the same coefficient of expansion, or, in fact, the same materials, may be used in the construction of these parts. When materials having the same coefficient of expansion are used, it is often advisable to insert insulating materials between the parts to reduce the transfer of heat therebetween.

Having described my invention, what I claim and desire to secure by Letters Patent of the United States is—

1. In a heating device, a member to be heated, a series of arcuate shoulders forming an annular support with grooves therebetween, a spider having legs extending through said grooves, a heating element on said annular support and over the parts of said legs in said grooves, said spider comprising material having a coefficient of expansion different from that of said member to be heated, and a switch controlled by movement of said spider.

2. In a heating device, a member to be heated, a series of arcuate shoulders forming an annular support with grooves therebetween, a spider having legs extending through said grooves, a heating element on said annular support and over the parts of said legs in said grooves, said spider comprising material having a coefficient of expansion less than that of said member to be heated, and a switch controlled by movement of said spider.

3. In a heating device, a member to be heated, a series of arcuate shoulders forming an annular support with grooves therebetween, a spider having legs extending through said grooves, a heating element on said annular support and over the parts of said legs in said grooves, said spider comprising material having a coefficient of expansion different from that of said member to be heated, a switch controlled by movement of said spider, and means for controlling the temperature at which movement of said switch occurs.

4. In a heating device, a member to be heated, a series of arcuate shoulders forming an annular support with grooves therebetween, a spider having legs extending through said grooves, a heating element on said annular support and over the parts of said legs in said grooves, said spider comprising material having a coefficient of expansion less than that of said member to be heated, a switch controlled by movement of said spider, and means for controlling the temperature at which movement of said switch occurs.

EDWIN C. FICHTNER.